June 19, 1951     R. S. HUNTER     2,557,108
SIGNALING MIRROR

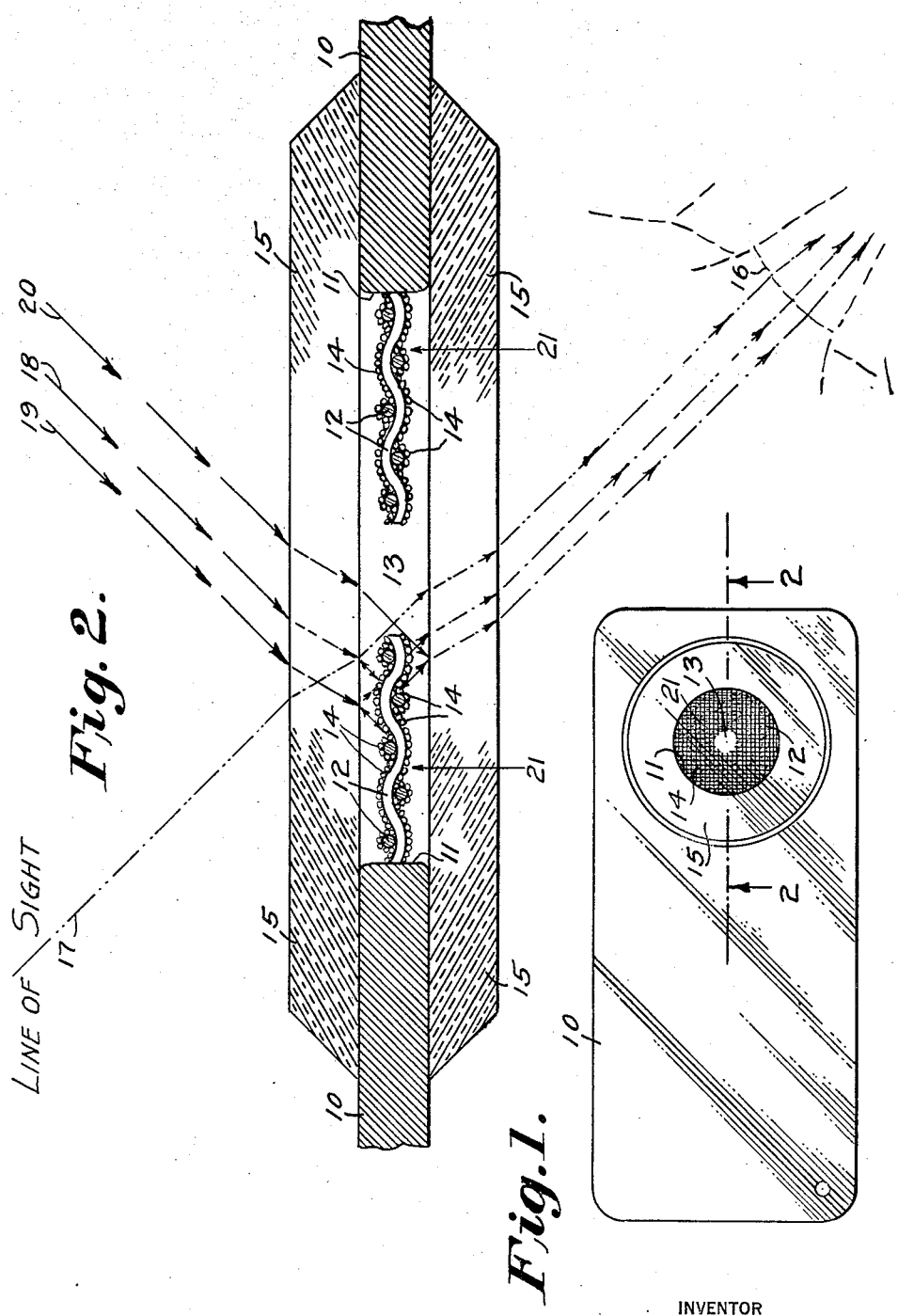

Filed Dec. 4, 1946     2 Sheets-Sheet 2

INVENTOR
RICHARD S. HUNTER
BY H. L. Godfrey
ATTORNEY

Patented June 19, 1951

2,557,108

UNITED STATES PATENT OFFICE 2,557,108

SIGNALING MIRROR

Richard S. Hunter, Franklin Park, Va., assignor to the United States of America as represented by the Secretary of Commerce Application December 4, 1946, Serial No. 713,948

4 Claims. (Cl. 116—20)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention relates to heliographic means for sending signals and particularly to an improvement upon the means for sending distress signals to passing aircraft disclosed in my application Serial Number 589,451, filed April 20, 1945, Patent Number 2,412,616, December 17, 1946.

My improved mirror provides a materially enlarged field of view, due to many light transmitting screen mesh openings rather than a single opening in the aiming mechanism. The enlarged field of view provided by my improved mirror is of the greatest assistance to a signaler in helping him direct reflected sunlight to his target with a minimum loss of time as he starts a signaling operation. As a further aid to saving time in starting to signal, my new form of mirror provides a brighter aiming spot than most previous forms. My new form is reversible, so that it becomes immaterial which face is used for reflecting sunlight.

In the accompanying drawings—

Figure 1 is a plan view of my improved mirror.

Figure 2 is an enlarged diagrammatic section on the line 2—2 of Figure 1, showing the operation of sighting my mirror on an airplane.

Figure 3:
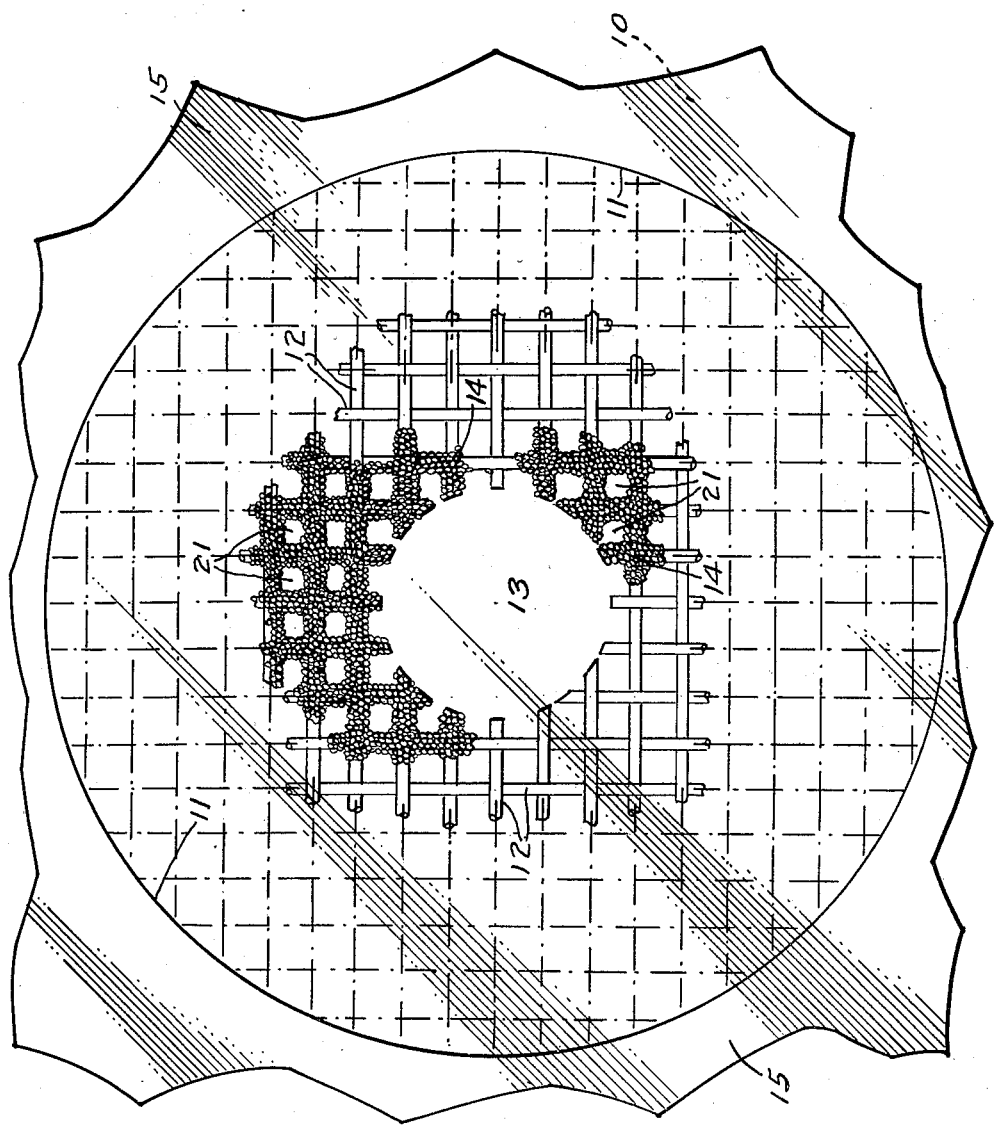

Figure 3 is a magnified detail plan view of the disk 12 mounted in the aperture 11 in the mirror 10.

In these drawings:

A mirror 10 is made of a non-frangible, non-rusting, highly reflecting material such as anodized aluminum. It is provided with an aperture 11 which is closed by a disk 12 of fine mesh screen having a central opening 13. Each wire of the screen 12 supports individual spherical beads 14 of high angularity such as those incorporated in Scotchlite and is inclosed by disks 15 of transparent refractive material cemented to either side of the opening. The "Scotchlite" type of beads is disclosed in Patents Nos. 2,407,680; 2,354,018, and others which were assigned before issue to Minnesota Mining and Manufacturing company, which assignee markets retroreflector sheets under their trade-mark "Scotchlite." The spherical beads incorporated in these retroreflector sheets have a refractive index about equal to 1.92 because spheres having this refractive index have the optimum retrodirective characteristic. The plan view Figure 3 is more highly magnified than Figure 2 and directs attention to the fact that there are numerous small openings 21 between the bead encrusted wires of the open mesh disk 12 through which rays of light are free to pass.

The operation of my device is diagrammatically indicated in Figure 2 in which the location of an eye of a signaler is indicated by 16; the direction of a line of sight to a target, for example an airplane, is indicated by the broken line 17 and the direction of rays of light from the sun is indicated by the parallel broken lines 18, 19 and 20. A plurality of such rays pass by refraction in the disks 15 and retroreflective beads 14 having a retrorefractive index 1.92 fall on the eye of an observer indicated at 16 and appear to him to form a small disk of light in the direction of the broken line 17. By moving the mirror the signaler moves this virtual image until it appears to fall upon an airplane in flight, or other target to be signaled; the signaler directs light from the entire mirror surface upon an occupant of the airplane and thereby attracts the attention of the latter. Having secured this attention, it may also be possible to flash signals by some known code. My device is very simple in form and has no moving parts to adjust; can be quickly aimed at a target and then kept on the latter even though the signaler is being tossed about by ocean waves. The use of plastic for the refracting disks 15 eliminates the danger of glass breakage.

This invention may be better understood by a reference to the applicant's Patents Nos. 2,504,982, April 25, 1950 (see Figure 7), and 2,412,616 (see Figure 6). Figure 7 of the later issued of these patents illustrates the method of using each of the applicant's signaling mirrors. Figure 6 of No. 2,412,616 is a diagrammatic view showing the directions of the line of sight, and the directions of refracted rays and mirror reflected rays. It will be apparent from a comparison of Figure 6 of this patent with the diagram, Figure 2, of this application, that the patent discloses a disk 19 which does not allow any rays to pass through it which fall on its high-angularity retrodirective reflecting surface, whereas this application discloses the substitution of a novel element, which comprises a fine mesh screen 12 having a multiplicity of fine openings 21 (Figures 1 and 3) through which light passes freely because the multiplicity of individual spherical beads 14 are secured to the wires of the screen 12 without bridging the openings between adjacent wires. This greatly improved signaling mirror provides the signaler, whose eye is close to the relatively large screen opening, with a wide field of view, and enables him to see his target before it comes within the field seen through the small central opening 13, while the beads 14 of this application which have a refractive index 1.92 provide a high-angularity retrodirective surface on each face of this screen.

With this improved "screen-type" mirror, the target and aiming spot are seen if they appear on any part of the relatively large cone of view through the entire aperture 11 instead of through a small central clear window 13. This is because the screen-type retroreflector provides a multiplicity of fine clear openings 21 through the retroreflector, instead of restricting the cone of view to that through the clear sighting opening 13 in the center of the retroreflector, as in the applicant's prior inventions.

The applicant's retroreflective aiming device is used within an inch of an operator's eye, too close for his eye to focus upon the screen 12, in which position the aiming spot appears at infinity, that is, the rays of light forming this virtual image of the sun enter the eye as substantially parallel rays. In other words, it is so close to the eye of the operator that he cannot focus upon it, but merely sees the rays projected by it toward his eye. Since rays from the sun strike the retroreflector in substantially parallel lines, and since the retroreflective mechanisms actually reverse the direction of light by reflection, the rays from the aiming mechanism which reach the operator's eye are substantially parallel, and produce on the retina of his eye the effect of a virtual image of the sun.

When using emergency signaling mirrors, it is highly important to provide a device which can be aimed with a minimum of loss of time, as well as with a minimum of practice and skill, and the reversible mirror claimed herein discloses such an improvement. Those previously patented have windows which provide fields of view which are so narrow that an operator cannot see a virtual image of the sun, which forms an aiming spot, until he succeeds in turning the mirror to approximately the correct angle.

It should be understood that the present disclosure is for the purpose of illustration only, and that the invention includes all modifications and equivalents which fall within the scope of the appended claims. For example, for the disk 12 of fine mesh screen, there may be substituted a sheet of material which is retroreflective on both surfaces and which sheet is provided with many small perforations, as well as one large perforation through which clear vision is possible.

What I claim is:

1. A signaling mirror provided with a window, a transparent refractive layer on both sides of said mirror and covering said window, an open mesh screen provided with a sighting aperture transverse to said window enclosed by said refractive layers, and a plurality of high angularity retrodirective beads encrusting the wires of said screen leaving mesh openings through which light and vision may pass.

2. In a signaling mirror of the sighting window type having a transparent refractive layer on each face of said mirror, the improvement which consists in a centrally apertured screen and a plurality of spherical high angularity retrodirective beads encrusting the wires of said screen leaving a plurality of light transmitting mesh openings.

3. An element adapted for use in an aperture in a signaling mirror comprising a centrally apertured open mesh screen to the opposite surfaces of which are secured a plurality of precision retroreflectors in the form of high angularity retrodirective, while leaving a plurality of mesh openings through which light passes freely.

4. In a signaling mirror of the sighting window type having two transparent refractive layers covering said window each layer being secured to a reflecting face of said mirror, the improvement which comprises a centrally apertured open mesh screen fitted within said window and rendered retrodirective by a multiplicity of spherical high angularity retrodirective beads secured thereto leaving many small mesh openings through which light passes directly.

RICHARD S. HUNTER.

REFERENCES CITED

The following references are of record in the file of this patent:

UNITED STATES PATENTS

| Number | Name | Date |
| --- | --- | --- |
| 1,176,746 | Federico | Mar. 28, 1916 |
| 1,246,495 | Tellyer | Nov. 13, 1917 |
| 1,497,989 | Russell | June 17, 1924 |
| 2,412,616 | Hunter | Dec. 17, 1946 |
| 2,432,928 | Palmquist | Dec. 16, 1947 |
| 2,440,584 | Heltzer et al. | Apr. 27, 1948 |
| 2,467,165 | Stimson | Apr. 12, 1949 |
| 2,504,982 | Hunter | Apr. 25, 1950 |

Certificate of Correction

Patent No. 2,557,108                             June 19, 1951

RICHARD S. HUNTER

It is hereby certified that error appears in the printed specification of the above numbered patent requiring correction as follows:

Column 4, line 25, after "retrodirective" and before the comma insert *beads*;

and that the said Letters Patent should be read as corrected above, so that the same may conform to the record of the case in the Patent Office.

Signed and sealed this 28th day of August, A. D. 1951.

[SEAL]

THOMAS F. MURPHY,
*Assistant Commissioner of Patents.*